J. R. McALISTER.
Carriage.
No. 92,536.
Patented July 13, 1869.
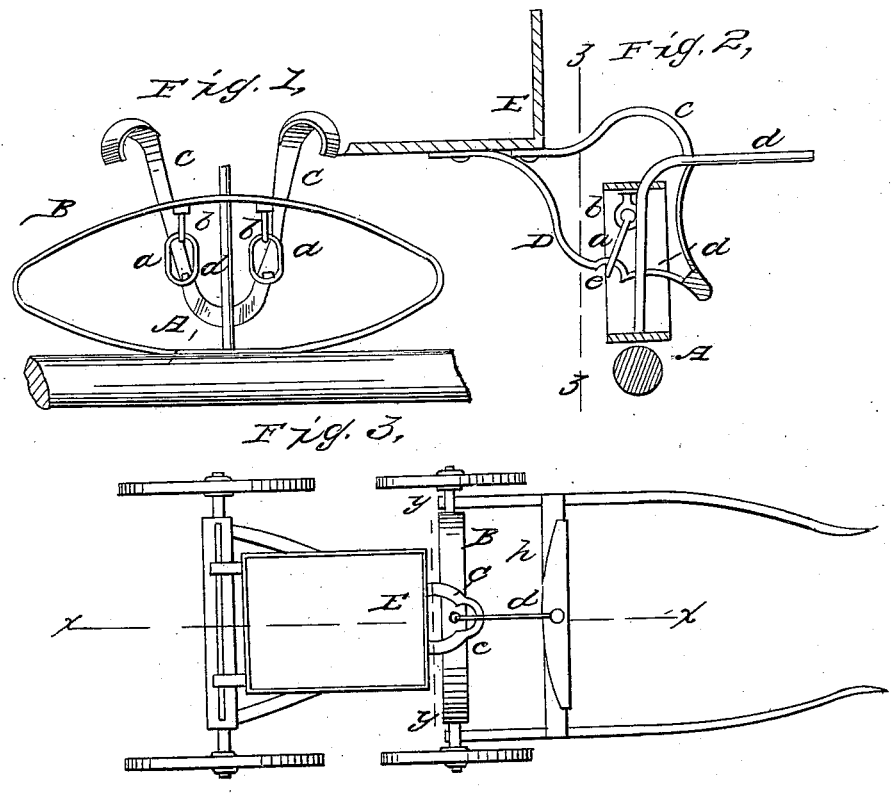
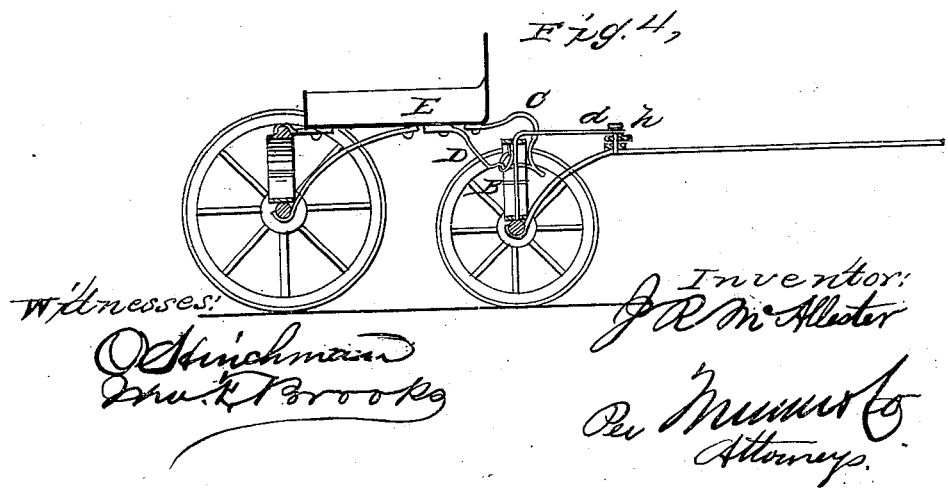

United States Patent Office.

J. R. McALISTER, OF HEUVELTON, NEW YORK.

Letters Patent No. 92,536, dated July 13, 1869.

---

IMPROVEMENT IN CARRIAGES.

---

The Schedule referred to in these Letters Patent and making part of the same.

---

*To all whom it may concern:*

Be it known that I, J. R. McALISTER, of Heuvelton, in the county of St. Lawrence, and State of New York, have invented a new and useful Improvement in Vehicles; and I do hereby declare that the following is a full, clear, and exact description thereof, which will enable others skilled in the art to make and use the same, reference being had to the accompanying drawings, forming part of this specification, in which—

Figure 1 is a detail rear view of my improvement from a section through $y\,y$, fig. 3.

Figure 2 is a detail section of the same, the section being taken through the line $x\,x$ of fig. 3.

Figure 3 is a top view of a buggy having my improvements.

Figure 4 is a section of fig. 3 through the line $x\,x$.

Similar letters of reference indicate like parts.

The object of this invention is to provide a front coupling for vehicles, which is simple and durable, and also possesses other advantages, which will hereinafter be set forth.

My invention consists in the manner of hanging the fore part of the box or bed-frame of the vehicle on the front spring by means of links and braces, as will hereinafter be more fully set forth.

In the drawings—

A is the front axle, and

B, the front spring affixed thereon, in any suitable manner.

The curved braces C C, of iron, are affixed to the front of the box or body E of the vehicle, as shown, and pass downward, where they converge toward each other and joint with and form part of the lower braces D, which latter curve upward again to the front of the vehicle-body, and are affixed thereto at points in rear of the points of attachment of the braces C C.

The two braces thus enclose the upper half of the front spring, and afford sufficient room for the latter to yield.

The lower braces are connected with the spring by means of links $a$, which depend from the eye-bolts $b$, or other suitable devices, affixed to the under side of the spring.

The lower brace thus rests in the rings, being formed with notches $e$, in which the rings play loosely, to keep the brace from slipping in the rings or links.

The rings or links may be composed of metal, as iron, or they may be made of leather, or rawhide, or other suitable material.

Being thus suspended, the front part of the body is hung upon the spring, and is supported by it, while, at the same time, the axle is free to turn to the right or left in the usual manner.

A stay-rod, $d$, arises from the axle or bottom of the spring, and passes loosely through a hole in the top half of the spring, after which it turns forward at, or nearly at a right angle, and passes to the cross-bar $h$ of the shafts, to which the end is affixed.

This stay-rod serves to keep the spring from being twisted backward or forward by the action of the body.

The shafts are easily raised, and will be kept so by the weight of the body upon the rings and spring.

Having thus described my invention,

I claim as new, and desire to secure by Letters Patent—

1. Suspending the front part of the box, body, or bed of a vehicle, by means of braces, and rings or straps attached to the upper part of the front spring, all substantially as and for the purpose shown and described.

2. The stay-rod $d$, in combination with the spring-braces and rings, substantially as and for the purpose shown and described.

J. R. McALISTER.

Witnesses:
 JOHN D. McBROOM,
 ROBERT McBRATNEY.